(12) United States Patent
Cho

(10) Patent No.: US 12,232,487 B2
(45) Date of Patent: Feb. 25, 2025

(54) MODULE TYPE AQUACULTURE TANK HAVING STEPWISE RECIRCULATING AQUACULTURE SYSTEM

(71) Applicant: Aqua Development Ltd., Seoul (KR)

(72) Inventor: Yong Kil Cho, Seoul (KR)

(73) Assignee: Aqua Development Ltd., Seoul (KR)

( * ) Notice: Subject to any disclaimer, the term of this patent is extended or adjusted under 35 U.S.C. 154(b) by 158 days.

(21) Appl. No.: 18/148,153

(22) Filed: Dec. 29, 2022

(65) Prior Publication Data

US 2023/0140295 A1    May 4, 2023

Related U.S. Application Data

(63) Continuation of application No. PCT/KR2021/008334, filed on Jul. 1, 2021.

(30) Foreign Application Priority Data

Jul. 2, 2020 (KR) .......................... 1020200081655

(51) Int. Cl.
*A01K 63/04* (2006.01)
*A01K 61/17* (2017.01)

(52) U.S. Cl.
CPC ............ *A01K 63/042* (2013.01); *A01K 61/17* (2017.01); *A01K 63/045* (2013.01)

(58) Field of Classification Search
CPC .... A01K 63/042; A01K 63/045; A01K 61/17; B01F 23/23231; B01F 23/232312
(Continued)

(56) References Cited

U.S. PATENT DOCUMENTS 1,526,179 A * 2/1925 Parr ...................... A01K 63/042
                                                    417/174
1,945,464 A * 1/1934 Thomas ...................... C10J 1/12
                                                    261/104
(Continued)

FOREIGN PATENT DOCUMENTS

CN        106035195 A   * 10/2016
DE        4312971 A1      10/1994
(Continued)

OTHER PUBLICATIONS

Merged translation of CN_106035195 (Year: 2016).*
Merged translation of KR_20180002548 (Year: 2018).*
Merged translation of KR_20180012944 (Year: 2018).*

*Primary Examiner* — Morgan T Jordan
(74) *Attorney, Agent, or Firm* — Reinhart Boerner Van Deuren P.C.

(57) ABSTRACT

A module type aquaculture tank having a stepwise recirculating aquaculture system according to the present disclosure may include a main fish breeding water tank including first, second, third, and fourth edges and having a square plane, an intermediate fish breeding water tank disposed adjacent to the first edge of the main fish breeding water tank, a plurality of recirculating filtration tanks arranged adjacent to each other along the third edge opposite to the first edge of the main fish breeding water tank, and an air lifting Venturi apparatus including a plurality of Venturi pipes arranged along the edges of an inside of the main fish breeding water tank and an air guide obliquely extending from an upper end of each of the plurality of Venturi pipes upward in an air spray direction.

13 Claims, 7 Drawing Sheets

(58) Field of Classification Search
USPC .......................................................... 261/77
See application file for complete search history.

(56) References Cited

U.S. PATENT DOCUMENTS

| | | | | |
|---|---|---|---|---|
| 2,415,650 | A * | 2/1947 | Mckee | C01B 17/92 |
| | | | | 422/256 |
| 2,772,867 | A * | 12/1956 | Cleckner | A01K 63/042 |
| | | | | 43/57 |
| 3,224,170 | A * | 12/1965 | Mitsuji | B01D 47/025 |
| | | | | 96/342 |
| 3,473,509 | A * | 10/1969 | Miyamura | A01K 61/00 |
| | | | | 119/212 |
| 3,587,976 | A * | 6/1971 | Jacuzzi | A61H 33/6026 |
| | | | | 239/588 |
| 3,691,730 | A * | 9/1972 | Hickey | B64D 37/32 |
| | | | | 244/135 R |
| 3,732,668 | A * | 5/1973 | Nichols | B64D 37/32 |
| | | | | 96/174 |
| 3,754,656 | A * | 8/1973 | Horiguchi | B03D 1/1462 |
| | | | | 210/221.2 |
| 3,984,323 | A * | 10/1976 | Evens | C02F 3/20 |
| | | | | 210/220 |
| 4,863,644 | A * | 9/1989 | Harrington | C02F 3/20 |
| | | | | 261/123 |
| 5,450,818 | A * | 9/1995 | Caillouet | A01K 61/10 |
| | | | | 119/226 |
| 5,961,831 | A * | 10/1999 | Lee | A01K 63/042 |
| | | | | 119/260 |
| 5,979,362 | A * | 11/1999 | McRobert | A01K 63/10 |
| | | | | 119/227 |
| 2003/0044332 | A1* | 3/2003 | Conrad | B01J 10/007 |
| | | | | 422/232 |
| 2004/0149233 | A1* | 8/2004 | Cummins | A01K 63/04 |
| | | | | 119/227 |
| 2006/0042556 | A1* | 3/2006 | Hsiao | A01K 61/59 |
| | | | | 119/204 |
| 2007/0035048 | A1* | 2/2007 | Emilsen | B01F 23/232 |
| | | | | 261/77 |
| 2007/0039557 | A1* | 2/2007 | Vaccari | A01K 63/045 |
| | | | | 119/259 |
| 2008/0048348 | A1* | 2/2008 | Kung | B01F 25/10 |
| | | | | 261/76 |
| 2012/0184001 | A1* | 7/2012 | Stephen | A01K 61/60 |
| | | | | 426/417 |
| 2013/0263792 | A1* | 10/2013 | Vento | A01K 61/10 |
| | | | | 119/226 |

FOREIGN PATENT DOCUMENTS

| | | | |
|---|---|---|---|
| FR | 2367705 | A1 | 5/1978 |
| JP | 2006142300 | A | 6/2006 |
| JP | 2015149985 | A | 8/2015 |
| KR | 100706273 | B1 | 4/2007 |
| KR | 1020070102367 | A | 10/2007 |
| KR | 20120001483 | U | 3/2012 |
| KR | 1020130067536 | A | 6/2013 |
| KR | 20180002548 | A * | 1/2018 |
| KR | 20180012944 | A * | 2/2018 |
| KR | 101950140 | B1 | 2/2019 |

* cited by examiner

MODULE TYPE AQUACULTURE TANK HAVING STEPWISE RECIRCULATING AQUACULTURE SYSTEM

FIELD OF THE INVENTION

The present disclosure relates to a module type aquaculture tank having a stepwise recirculating aquaculture system installed in a fish farm and utilized for cultivating seafood such as shrimp.

BACKGROUND OF THE INVENTION

Demand for fresh fish or seafood that is preferred as health food compared to meat is continuously increasing due to a preference phenomenon for well-being food according to the improvement of the standard of living of the people. Due to such an increase in the demand, indiscriminate overfishing of fish is occurring in coastal waters, and a water quality environment also deteriorates due to an environmental pollution caused by the industrial development, and natural resources of fish population are continuously decreasing.

In such a situation, it is expected that the aquaculture industry as a breeding fishery rather than a catching fishery will be more active than before as the industry proceeds in a direction of resolving the mismatch between demand and supply of seafood. However, because shallow sea aquaculture in coastal waters is not stable due to various risk factors such as natural disasters and water pollution as well as various diseases, onshore installation type aquaculture tanks that cultivate various fish species by installing aquaculture tanks on shore rather than in the sea are becoming popular.

The onshore installation type aquaculture tanks include a race-way water tank, a circular water tank, etc. Among these tanks, a race-way water tank system has good area utilization efficiency, but there are many inconveniences in terms of energy utilization rate and pipe, and the circular water tank has advantages and disadvantages that area utilization efficiency is low but energy utilization efficiency is relatively good.

In general, because water (seawater or freshwater) accommodated in the onshore installation type aquaculture tank is mixed with the leftover feed of fish and fish excretions are mixed with the feed, when the water is left for a long time, the amount of dissolved oxygen decreases, leading to the death of fish in the tank.

Therefore, in order to supply sufficient oxygen in the water in the tank, an aberration wheel, an air disperser, etc. are utilized, or liquid oxygen, high pressure oxygen, an oxygen generator, etc. are applied. However, these apparatuses may not be efficient depending on fish species while requiring excessive facility investment, and there is a problem in that aquaculture production costs increase because management and operation of these apparatuses require a lot of cost.

One aspect of the present disclosure is to provide a module type aquaculture tank having a stepwise recirculating aquaculture system configured to simultaneously improve area efficiency and energy utilization efficiency, enabling high-density aquaculture, and capable of securing independence of operation of each water tank.

However, the problems to be solved by the embodiments of the present invention are not limited to the above problems and may be variously extended within the scope of the technical idea included in the present invention.

BRIEF SUMMARY OF THE INVENTION

According to an embodiment of the present invention, a module type aquaculture tank having a stepwise recirculating aquaculture system includes a main fish breeding water tank comprising first, second, third, and fourth edges and having a square plane, an intermediate fish breeding water tank disposed adjacent to the first edge of the main fish breeding water tank, a plurality of recirculating filtration tanks arranged adjacent to each other along the third edge opposite to the first edge of the main fish breeding water tank, and an air lifting Venturi apparatus comprising a plurality of Venturi pipes arranged along the edges of an inside of the main fish breeding water tank and an air guide obliquely extending from an upper end of each of the plurality of Venturi pipes upward in an air spray direction.

The module type aquaculture tank may further include a water supply pipe extending along an upper edge of the main fish breeding water tank and transporting and supplying water, and the air lifting Venturi apparatus may be connected to the water supply pipe to receive water.

The water supply pipe may extend along four edges of the main fish breeding water tank.

The plurality of circulating filtration tanks may include first, second, third, and fourth filtration tanks that sequentially filter and move flowed breeding water, the first filtration tank may be configured to allow the breeding water to flow from the main fish breeding water tank, and the fourth filtration tank may be configured to supply the breeding water to the main fish breeding water tank.

The main fish breeding water tank may be installed so that ⅔ of a depth of the tank is below a ground surface and ⅓ of the depth of the tank is exposed to the ground.

The air guide may be configured in a plate shape having a cross-section convexly rounded upward.

The air lifting Venturi apparatus may further include a first inflow pipe extending in the form of a tube to guide inflow of water, a second inflow pipe extending in the form of a tube to guide inflow of air or oxygen, and a spray nozzle connected to an outflow port of the Venturi pipe, the Venturi pipe may include a through passage having a neck portion having a diameter smaller than a diameter of an inflow port between the inflow port and an outflow port, and the first inflow pipe may be connected to the inflow port and the second inflow pipe may be connected to the neck portion.

The air guide may extend to a height close to an upper end portion of the second inflow pipe.

The air guide may include a support extending from an upper surface and having one end fixed to the second inflow pipe.

The support may include a first support located close to an upper end portion of the second inflow pipe and a second support located close to a Venturi pipe connection portion of the second inflow pipe.

The module type aquaculture tank may further include a water supply pipe extending along an edge of the main fish breeding water tank and transporting and supplying water, the first inflow pipe may include an inflow portion having an upper end connected to the water supply pipe and extending vertically downward and a connection portion extending from a lower end of the inflow portion and bent to be connected to the inflow port of the Venturi pipe.

A diameter of the second inflow pipe may be formed to be smaller than a diameter of the first inflow pipe.

A diameter of the spray nozzle may be formed to be smaller than the diameter of the inflow port of the Venturi pipe.

According to the module type aquaculture tank having a stepwise recirculating aquaculture system according to an embodiment of the present invention, the air lifting Venturi apparatus may be provided along the edge while configuring the square water tank, thereby simultaneously improving area utilization efficiency and energy utilization efficiency, and maximizing productivity.

In addition, when the air bubbles with kinetic energy to rise vertically are moved forward using the air lifting Venturi apparatus, there is the effect of moving the water forward together, which has the effect of accelerating a water circulation necessary for aquaculture.

In addition, high-density aquaculture is possible by applying the module type aquaculture water tank, and risk factors of disease and death may be reduced through the independence of operation of each water tank, and planned production is possible, thereby maximizing income and increasing a success rate.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 1:
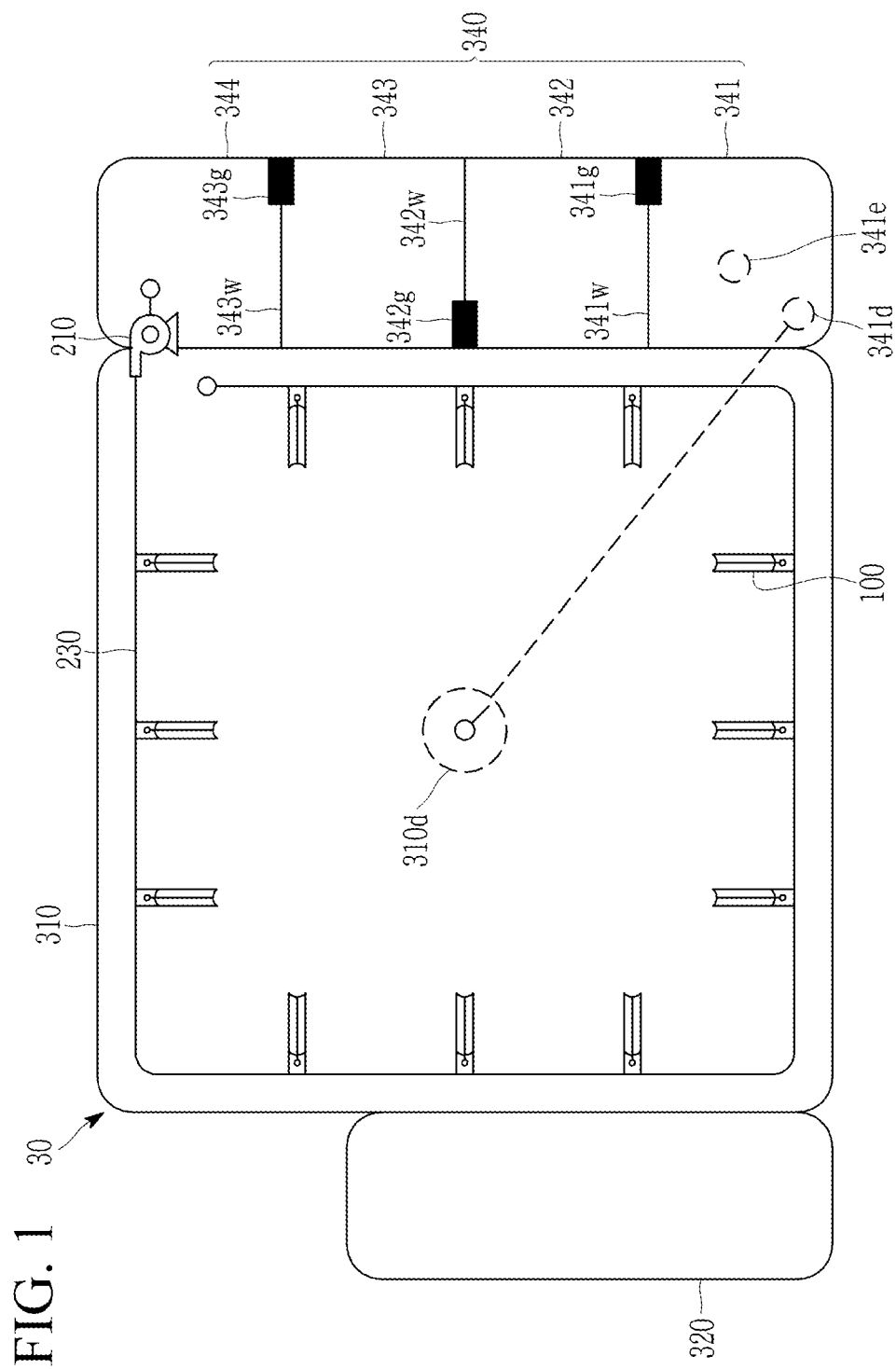
FIG. 1 is a plan view schematically showing a module type aquaculture water tank having a stepwise recirculating aquaculture system according to an embodiment of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Hereinafter, it will be described in detail with reference to the accompanying drawings so that those skilled in the art may easily carry out the present invention. In order to clearly describe the present invention in the drawings, parts irrelevant to the description are omitted, and the same reference numerals are attached to the same or similar components throughout the specification. In addition, the accompanying drawings are only for easy understanding of the embodiments disclosed in the present specification, do not limit the technical idea disclosed in the present specification, and should be understood to include all changes, equivalents or substitutes included in the spirit and scope of the present disclosure.

The terms including an ordinal number, such as first, second, etc., may be used to describe various components, but the components are not limited by the terms. These terms are used only for the purpose of distinguishing one component from another.

It will be understood that when a component is referred to as being "connected" or "coupled" to another component, the component may be directly connected or coupled to the other component, but other components may exist therebetween. On the other hand, it will be understood that when a component is referred to as being "directly connected" or "directly coupled" to another a component, no other component exists therebetween.

Throughout the specification, it will be further understood that the terms "comprises" and/or "comprising," when used in the present specification, specify the presence of stated features, integers, steps, operations, components, and/or parts, but do not preclude the presence or addition of one or more other features, integers, steps, operations, components, parts, and/or combinations thereof. Therefore, when a part "includes" a certain component, it means that the part does not exclude other components but may further include other components unless otherwise stated.

Hereinafter, in the embodiment of the present invention, shrimp aquaculture is described as an example, but the present invention is not limited thereto and may be used for aquaculture of organisms including various fish and crustaceans.

In addition, in the present specification, a 'square' does not mean only a mathematically perfect square, and may have some differences in the angles of four corners and the lengths of four sides to the extent that a person skilled in the art of the present invention may understand and tolerate. Therefore, the scope of the present invention should not be limited to the mathematically perfect square.

FIG. 1 is a plan view schematically showing a module type aquaculture water tank having a stepwise recirculating aquaculture system according to an embodiment of the present invention.

Referring to FIG. 1, a module type aquaculture water tank 30 according to the present embodiment may include a main fish breeding water tank 310 having a square plane, an intermediate fish breeding water tank 320 disposed adjacent to one side of the main fish breeding water tank 310, and a recirculating filtration tank 340 disposed adjacent to the main fish breeding water tank 310 on the opposite side of the intermediate fish breeding water tank 320.

The main fish breeding water tank 310 having the square plane may include first, second, third, and fourth edges. Here, the intermediate fish breeding water tank 320 may be disposed adjacent to the first edge of the main fish breeding water tank 310, and a plurality of recirculating filtration tanks 340 may be arranged adjacent to each other along the third edge opposite to the first edge of the main fish breeding water tank 310. The recirculating filtration tank 340 may physically treat suspended filth (feed scraps, excrement, etc.) generated in the main fish breeding water tank 310 through free fall and precipitation for a long time, biologically decompose and remove harmful gases and harmful components that are not well treated by physical methods, such as nitrogen and ammonia by using aerobic microorganisms, and then supply breeding water back to the main fish breeding water tank 310 and continuously recycle the breeding water. Therefore, the recirculating filtration tank 340 may include a gravity precipitation tank, a biological filtration tank, etc. according to the design of a filtration method, and the present invention is not limited to such a filtration method.

The plurality of recirculating filtration tanks 340 may include first, second, third, and fourth filtration tanks 341, 342, 343, and 344 that sequentially filter and move the breeding water flowed from the main fish breeding water tank 310. Here, a drainage port 310d in a bottom surface of the main fish breeding water tank 310 may be connected to a water entrance port 341d in a bottom surface of the first filtration tank 341 and configured to allow breeding water to flow from the main fish breeding water tank 310 into the first filtration tank 341.

The first to fourth filtration tanks 341, 342, 343, and 344 may be configured to maintain the same water level through water gates 341g, 342g, and 343g which are respectively formed on filtration tank walls 341w, 342w, and 343w located between the adjacent filtration tanks. The water gates 341g, 342g, and 343g may be made respectively by cutting, for example, the filtration tank walls 341w, 342w, and 343w to a width of 30 cm and a length of 50 to 70 cm so that filtered water overflows.

A pump 210 utilized to operate the air lifting Venturi apparatus 100 may be installed in the fourth filtration tank 344, and may be used to supply the filtered water of the fourth filtration tank 344 to the main fish breeding water tank 310. In the main fish breeding water tank 310 having a high water level due to the supply of the filtered water of the fourth filtration tank 344, the breeding water may be discharged through the drainage port 310d installed in the center of the bottom surface and move to the first filtration tank 341. The filtered water of the first filtration tank 341 having a high water level again may overflow into the second filtration tank 342 through the first water gate 341g made by cutting the upper end of the filtration tank wall 341w at the opposite position of the water entrance port 341d of the first filtration tank 341 in a diagonal direction. The filtered water of the second filtration tank 342 having such a high water level may overflow into the third filtration tank 343 through the second water gate 342g made by cutting the upper end of the filtration tank wall 342w at the opposite position of the first water gate 341g in a diagonal direction. Likewise, the filtered water of the third filtration tank 343 may overflow into the fourth filtration tank 344 through the third water gate 343g made by cutting the upper end of the filtration tank wall 343w at the opposite position of the second water gate 342g in a diagonal direction.

When the pump 210 installed in the fourth filtration tank 344 continuously pumps water into the main fish breeding water tank 310, the water level of the main fish breeding water tank 310 rises. In this case, the breeding water may move to the first filtration tank 341 through the drainage port 310d in the bottom surface of the main fish breeding water tank 310 due to a water level difference to raise the water level of the first filtration tank 341, and operate as described above to continuously overflow to the next filtration tank, so that water circulation may be achieved naturally. Therefore, in the module type aquaculture water tank 30 according to the present embodiment, no additional energy may be required for water circulation other than supplying water to the main fish breeding water tank 310 through the pump 210.

Intermediate fish breeding is a necessary process to maximize survival and growth rates in high-density aquaculture, and may be performed in the intermediate fish breeding water tank 320. For example, in the case of shrimp aquaculture, shrimp is raised in the intermediate fish breeding water tank 320 for about one month after young shrimps are stocked, and then cultured in the main fish breeding water tank 310 until shipment. In addition, the module type aquaculture water tank 30 may be designed in a structure in which organic residues such as feed scraps, shrimp feces, and flocks remaining in the main fish breeding water tank 310 are filtered while passing through the recirculating filtration tank 340, and clear water passing through the recirculating filtration tank 340 circulates again to the main fish breeding water tank 310.

In addition, the remaining sludge stored in the recirculating filtration tank 340 may be collected again, concentrated and dried, and firstly reused as feed raw materials, secondarily used for farming using salt, and thirdly diluted to a low salt of less than 1 ppt in general freshwater farming and used as compost. To this end, a drainage port 341e may be installed in the bottom surface of the first filtration tank 341 of the recirculating filtration tank 340, and precipitated sediment may be discharged therethrough The drainage port of the first filtration tank 341 may be connected to one or more small water tanks (not shown) separately prepared through a drain connected thereto. In addition, drum filters may be installed in the small water tanks to filter out and concentrate large solids, and a separate facility may be used for concentration and drying of these solids.

The air lifting Venturi apparatus 100 may be installed along the edge of the inside the main fish breeding water tank 310. The air lifting Venturi apparatus 100 may include a Venturi pipe 130 and an air guide 150 installed at an upper end of the Venturi pipe 130. That is, a plurality of Venturi pipes 130 of the air lifting Venturi apparatus 100 may be arranged along an inner edge of the main fish breeding water tank 310, and the air guide 150 may obliquely extend from the upper end of the Venturi pipe 130 upward in an air spray direction.

The air lifting Venturi apparatus 100 may be connected to a water supply pipe 230 to receive water to be used as breeding water.

The water supply pipe 230 may be installed while extending along the edge of the main fish breeding water tank 310 in the square, and the pump 210 for supplying water may be installed in the fourth filtration tank 344 of the recirculating filtration tank 340 so that the clear water filtered in the recirculating filtration tank 340 may be supplied to the main fish breeding water tank 310.

The pump 210 may be provided as, for example, a self-priming pump. When a suction port of the self-priming pump is located on the bottom surface of the fourth filtration tank 344 or in water and the pump 210 is operated, the water in the fourth filtration tank 344 is sprayed by the function of the self-priming pump, and moved to the water supply pipe 230 connected to a water exit port of the self-priming pump. The water supply pipe 230 may have a branch pipe installed to extend along the four edges of the main fish breeding water tank 310 and branching in a vertical direction from the water supply pipe 230 toward the bottom surface of the main fish breeding water tank 310 so that water may be moved to the main fish breeding water tank 310 through the branch pipe. The branch pipe may be a first inflow pipe 110 of the air lifting Venturi apparatus 100. The air lifting Venturi apparatus 100 will be described in more detail with reference to FIGS. 4 to 7 below.

Figure 2:
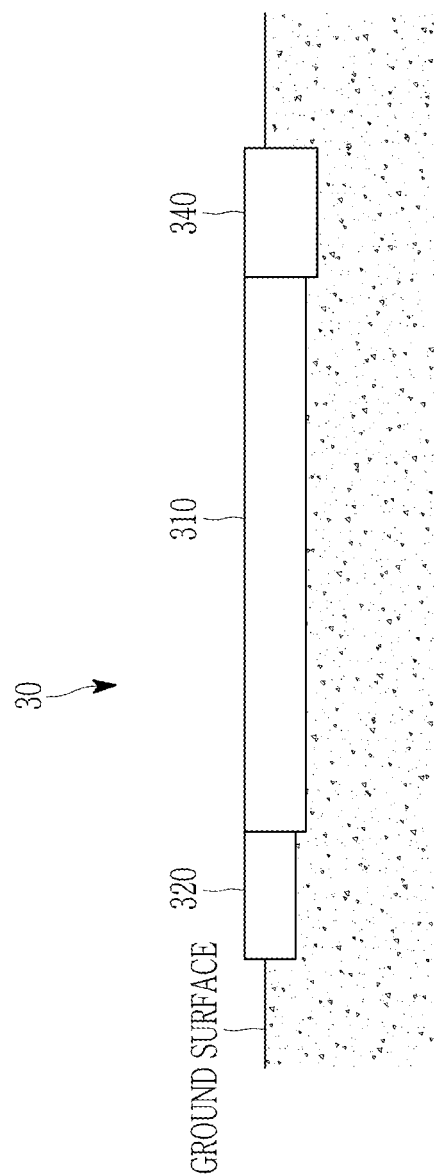
FIG. 2 is a cross-sectional view showing a state in which the module type aquaculture water tank shown in FIG. 1 is partially located below a ground surface.

FIG. 2 is a cross-sectional view showing a state in which the module type aquaculture water tank shown in FIG. 1 is partially located below a ground surface.

Referring to FIG. 2, the main fish breeding water tank 310 may be installed so that ⅔ (two-thirds) of the depth of the tank is below the ground surface and ⅓ (one-third) of the depth of the tank is exposed to the ground.

When an onshore installation type aquaculture tank is exposed above the ground surface, it is greatly affected by the air temperature and is very disadvantageous in terms of energy conservation, especially during the period from autumn to spring, which may cause an increase in the production cost. Therefore, in order to solve this problem, ⅔ of the depth of the tank is exposed below the ground surface and ⅓ thereof is exposed to the ground, which may solve the inconvenience of work compared to the case where the depth of the tank is completely exposed to the ground, may be also advantageous for energy conservation and minimize reduction in usability.

Figure 3:
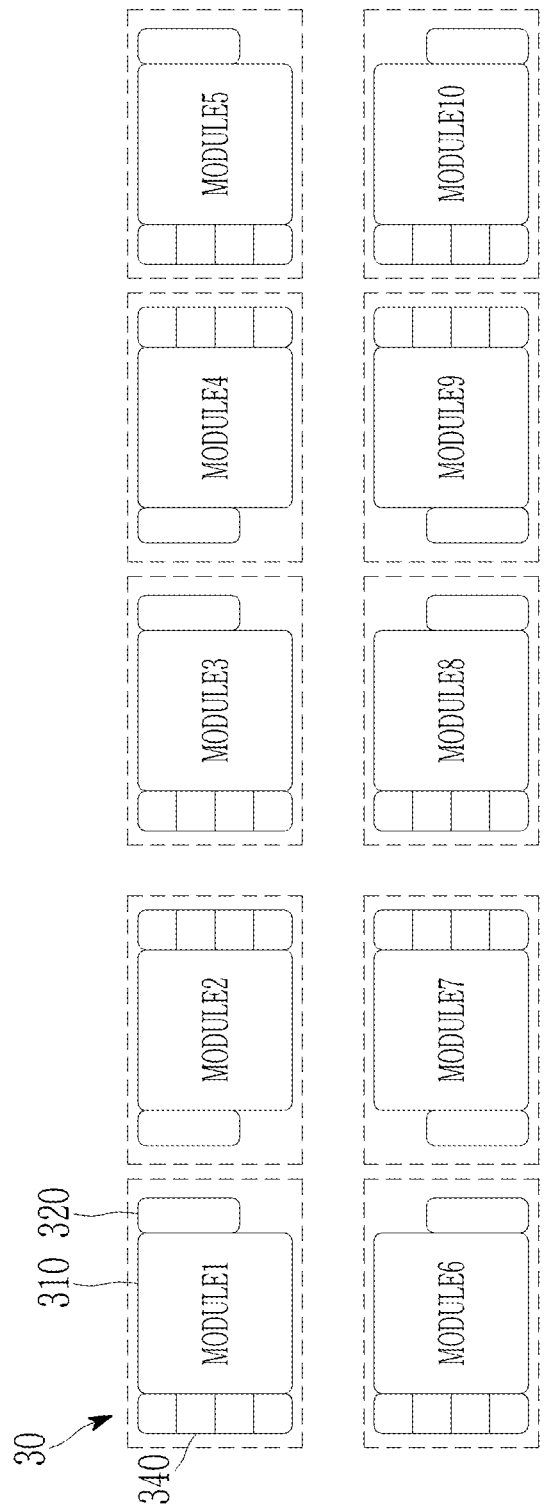
FIG. 3 is a schematic diagram showing a state in which a plurality of module type aquaculture water tanks are arranged according to an embodiment of the present invention.

FIG. 3 is a schematic diagram showing a state in which a plurality of module type aquaculture water tanks are arranged according to an embodiment of the present invention.

The module type aquaculture water tanks 30 each may be configured as a module and arranged adjacent to each other in one fish farm. For example, as shown in FIG. 3, modules 1 to 10 may be arranged in a matrix of 2 rows and 5 columns.

The composition of the tank in one module of the module type aquaculture water tank 30 may include one intermediate fish breeding water tank, one main fish breeding water tank, and four recirculating aquaculture system (RAS). For example, in the case of shrimp aquaculture, shrimp is raised in the intermediate fish breeding water tank for about one month after young shrimps are stocked, and then cultured in the main fish breeding water tank until shipment, and four recirculating aquaculture system (RAS) may be provided to reduce sludge generated during a fish breeding period.

Aquaculture is possible at a higher density by independently configuring the plurality of module type aquaculture water tanks 30 in one farm as above, and risk factors of disease and death may be reduced through the independence of operation of each water tank, and planned production is possible, thereby maximizing income and increasing a success rate.

Figure 4:
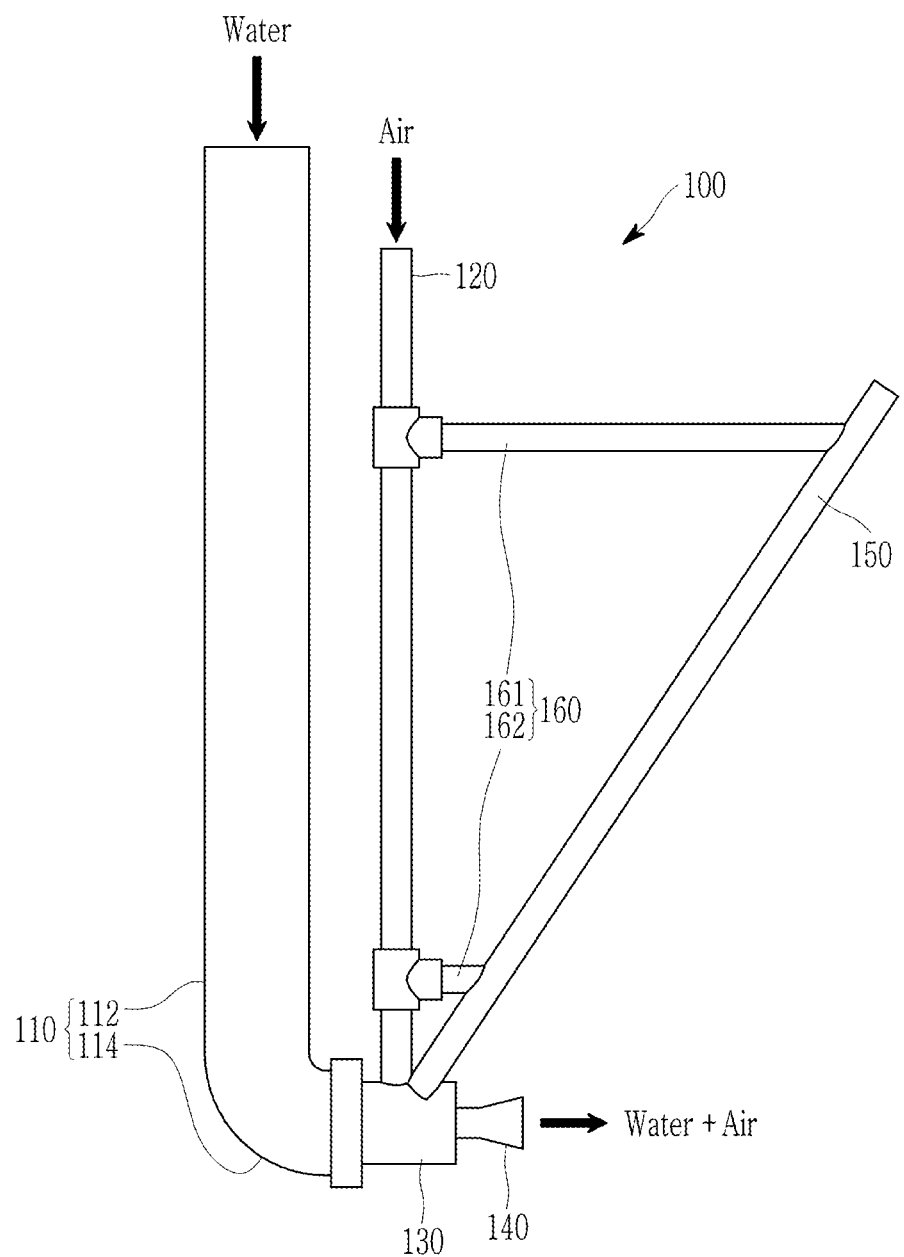
FIG. 4 is a front view showing an air lifting Venturi apparatus according to an embodiment of the present invention.
Figure 5:
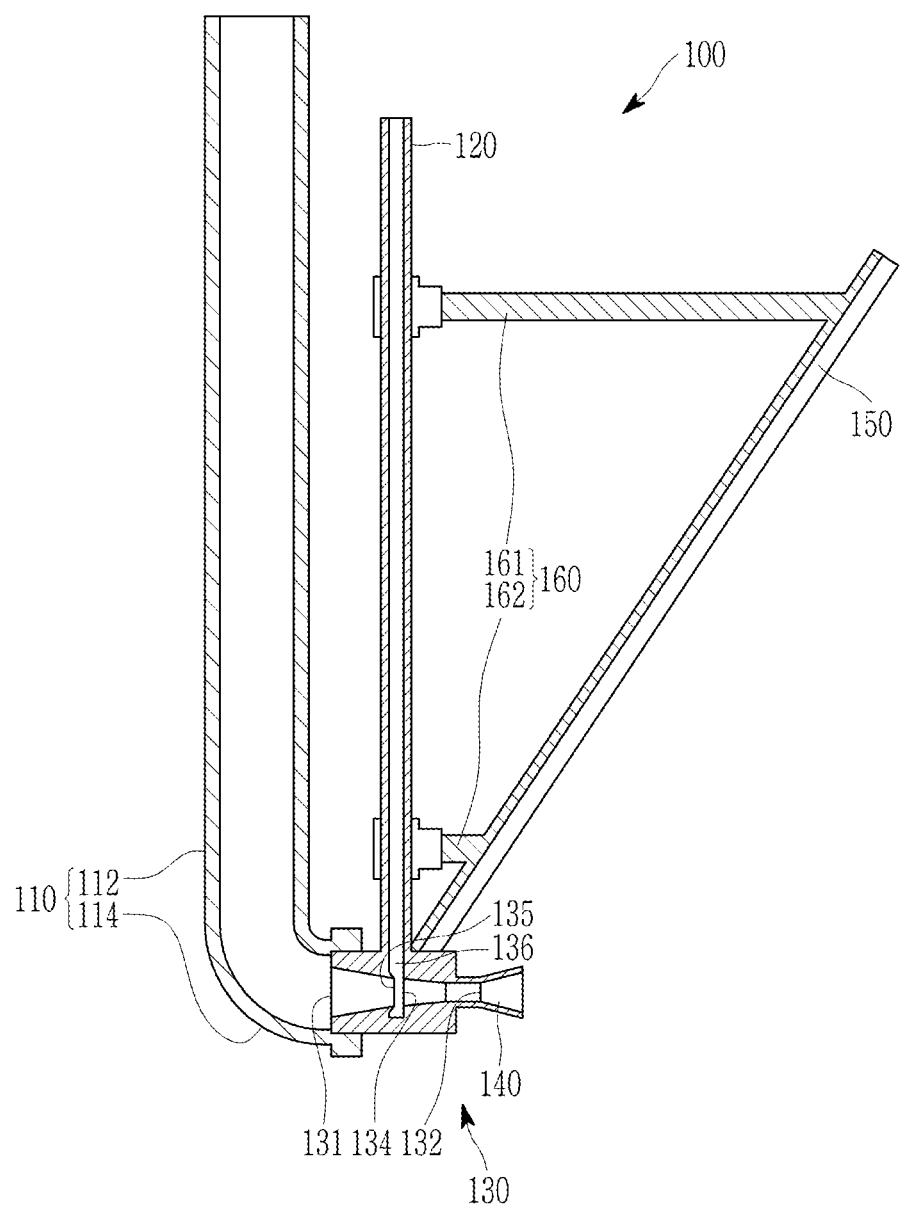
FIG. 5 is a cross-sectional view showing the air lifting Venturi apparatus shown in FIG. 4 cut along a plane parallel to the ground.

FIG. 4 is a front view showing an air lifting Venturi apparatus according to an embodiment of the present invention. FIG. 5 is a cross-sectional view showing the air lifting Venturi apparatus shown in FIG. 4 cut along a plane parallel to the ground.

Referring to FIG. 4, the air lifting Venturi apparatus 100 according to the present embodiment includes the first inflow pipe 110 guiding the inflow of water, a second inflow pipe 120 guiding the inflow of air, and the Venturi pipe 130 to which each of the first inflow pipe 110 and the second inflow pipe 120 is connected. The first inflow pipe 110 and the second inflow pipe 120 may be elongated in the form of a tube, and may provide passages through which water and air may move, respectively.

The air guide 150 extending obliquely toward a front upper portion from an upper end of the Venturi pipe 130 may be formed at the upper end of the Venturi pipe 130 and may extend to a height close to an upper end portion of the second inflow pipe 120. The air guide 150 may be fixed to the second inflow pipe 120 through a support 160. The support 160 may extend from an upper surface of the air guide 150 and have one end fixed to the second inflow pipe 120. The support 160 may comprise a plurality of supports, and may comprise a first support 161 located close to the upper end portion of the second inflow pipe 120 and a second support 162 located close to a Venturi pipe connection portion of the second inflow pipe 120.

Referring to FIG. 5, the first inflow pipe 110 may include an inflow portion 112 having an open upper portion and vertically extending and a connection portion 114 that is bent by being connected to a lower end of the inflow portion 112 and connected to the Venturi pipe 130.

The Venturi pipe 130 may include an inflow port 131 and an outflow port 132, and may have a neck portion 134 having a smaller diameter than the inflow port 131 between the inflow port 131 and the outflow port 132. Here, the first inflow pipe 110 may be connected to the inflow port 131 and the second inflow pipe 120 may be connected to the neck portion 134. In addition, the Venturi pipe 130 may further include an injection nozzle 135 protruding to be tapered from the neck portion 134 in a fluid flow direction. In addition, a spray nozzle 140 may be connected to the outflow port 132 of the Venturi pipe 130. The spray nozzle 140 may have a diffuser structure in which the diameter gradually increases again from the outflow port 132 of the Venturi pipe 130.

The inflow portion 112 of the first inflow pipe 110 and the second inflow pipe 120 may extend vertically downward in parallel with each other. Here, the diameter of the second inflow pipe 120 may be formed to be smaller than the diameter of the inflow portion 112 of the first inflow pipe 110. The first inflow pipe 110 may be connected to the Venturi pipe 130 as the connection portion 114 that extends from the inflow portion 112 and bent is connected to the inflow port 131 of the Venturi pipe 130. The second inflow pipe 120 may be fixed to a side surface of the Venturi pipe 130 and may be connected to the neck portion 134 through a lateral passage 136.

As described above, the diameter of the neck portion 134 of the Venturi pipe 130 may be smaller than the diameter of the inflow port 131. In addition, the diameter of the spray nozzle 140 may be formed to be smaller than the diameter of the inflow port 131 of the Venturi pipe 130, and may be formed such that the diameter of the spray nozzle 140 is such that the diameter of the spray nozzle 140 gradually increases from the outflow port 132 of the Venturi pipe 130 in the fluid flow direction.

The Venturi pipe 130 configured as described above may be utilized as an apparatus for supplying dissolved oxygen in an aquaculture water tank using the Bernoulli principle. Air may flow in through the second inflow pipe 120 due to a negative pressure generated by a flow rate increased when water drawn up by using a pump installed in a breeding water tank (e.g., a recirculating filtration tank) passes through the first inflow pipe 110 and be supplied into the Venturi pipe 130, and again passes through the neck portion 134 having the diameter narrowing to several millimeters in the Venturi pipe 130. The flowed air may be mixed with water while passing through the Venturi pipe 130. The water and air mixed as above may be sprayed again into the breeding water tank (e.g., a fish breeding water tank) through the spray nozzle 140. At this time, because the air contains about 21% of oxygen component, oxygen contained in small air bubbles strongly ejected from the spray nozzle 140 may be supplied into the water tank, and thus, oxygen may be supplied. In the case of ultra-high density aquaculture, a large amount of oxygen is required. In this regard, an oxygen supply pipe (not shown) connecting the second inflow pipe 120 used for air inflow may be installed and connected to an oxygen storage facility, and thus, pure oxygen may be also supplied.

Figure 6:
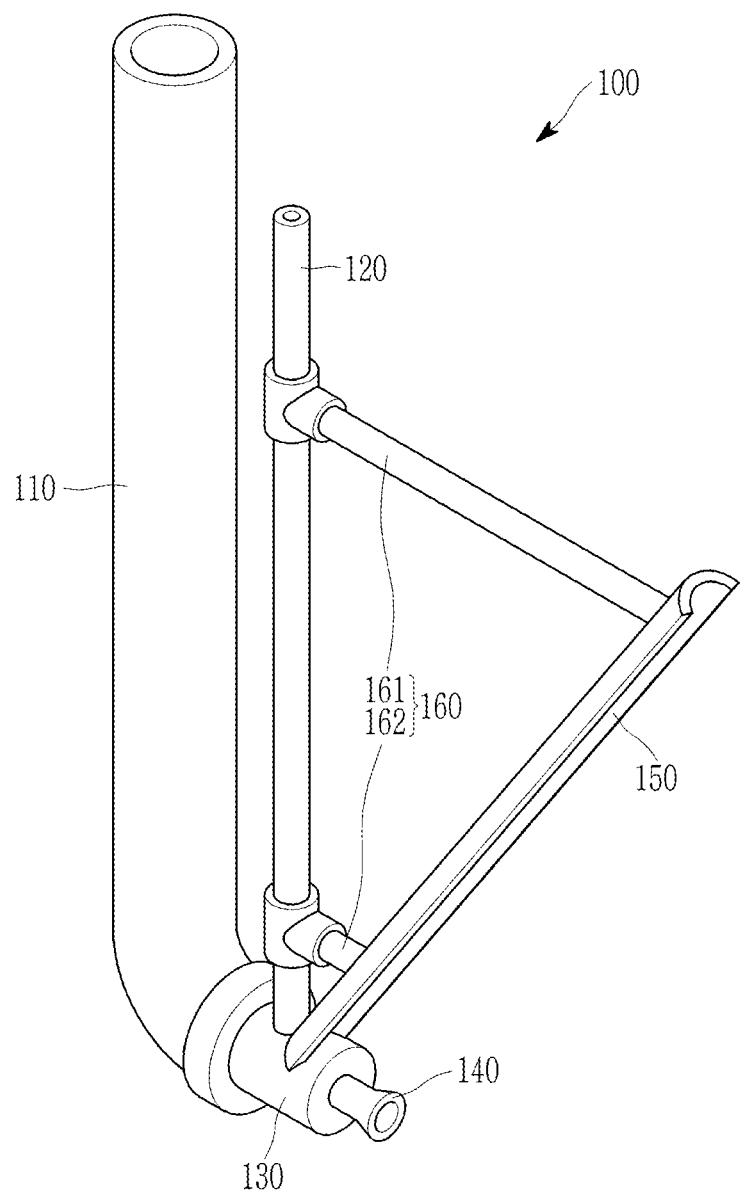
FIG. 6 is a perspective view showing an air lifting Venturi apparatus according to an embodiment of the present invention.

FIG. 6 is a perspective view showing an air lifting Venturi apparatus according to an embodiment of the present invention. FIG. 6 shows the air lifting Venturi apparatus 100 from an angle at which the shape of the air guide 150 may be better revealed.

Referring to FIG. 6, the air guide 150 may be formed in a plate shape having a cross-section convexly rounded upward. The air guide 150 in the plate shape may be provided to obliquely extend from the upper end of the Venturi pipe 130 to the front upper portion in the spraying direction of the spray nozzle 140. Therefore, air bubbles formed in a water tank by air sprayed from the spray nozzle 140 may not move directly above a water surface but may be guided in a direction away from the spray nozzle 140 along the air guide 150 and gradually move toward the water surface. This may allow the air bubbles to stay in the water tank for a longer period of time, and as a result, more oxygen may be dissolved in the water.

Figure 7:
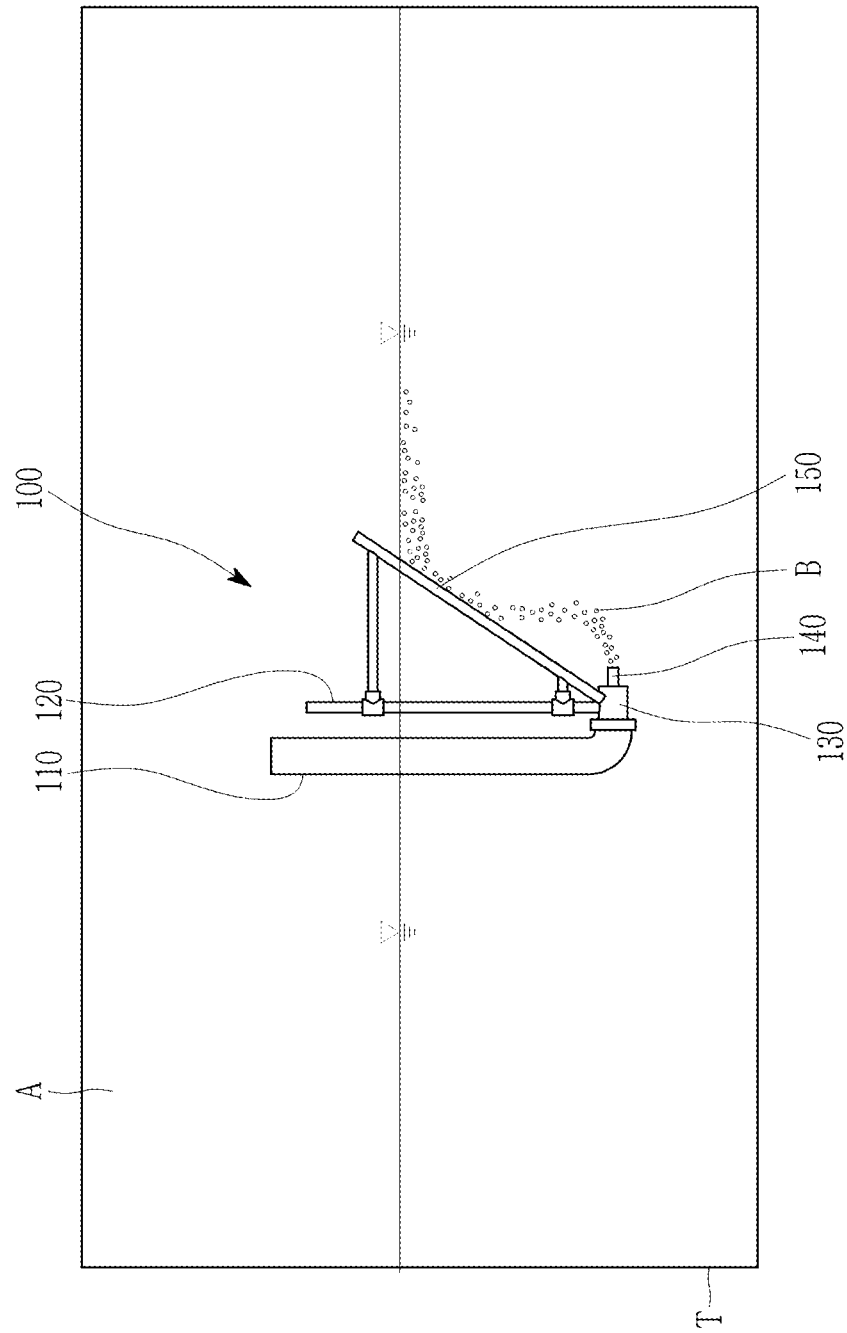
FIG. 7 is a diagram for explaining a state in which an air lifting Venturi apparatus according to an embodiment of the present invention is installed and operates in a water tank.

FIG. 7 is a diagram for explaining a state in which an air lifting Venturi apparatus according to an embodiment of the present invention is installed and operates in a water tank.

Referring to FIG. 7, the air lifting Venturi apparatus 100 according to the present embodiment may be installed so that the Venturi pipe 130 is submerged in a water tank T. When water flows in through the first inflow pipe 110 of the air lifting Venturi apparatus 100, the flowed water may be transported to the Venturi pipe 130 connected to the first inflow pipe 110, and according to the characteristics of the Venturi pipe 130, a negative pressure may be applied to the second inflow pipe 120 connected to the neck portion 134 of the Venturi pipe 130 so that air may flow from an atmosphere A. That is, as the pressure inside the second inflow pipe 120 is lower than an atmospheric pressure, air in the atmosphere A may flow into the second inflow pipe 120. To this end, the second inflow pipe 120 may be installed such that an upper end portion having an opening for air inflow is exposed above the water surface. In the first inflow pipe 110, an opening for water inflow may be connected to a water supply pipe (not shown) and may receive water.

As described above, the air guide 150 may be formed to obliquely extend from the upper end of the Venturi pipe 130 toward the front upper portion of the spray nozzle 140 in a spray direction. That is, the air guide 150 may extend upward toward the water surface farther away from the spray nozzle 140. Also, as shown in FIG. 3, the air guide 150 may be formed in a plate shape having a cross-section convexly rounded upward. In addition, the air guide 150 may extend to a height close to the upper end of the second inflow pipe 120, and thus, even when the air lifting Venturi apparatus 100 is installed in the water tank T, the upper end portion of the air guide 150 may be exposed above the water surface.

The air guide 150 formed as above may be provided, and thus, air bubbles B sprayed from the spray nozzle 140 may float upward and may move in the water tank T along the air guide 150 in a direction away from the spray nozzle 140. That is, when the air guide 150 is not provided, the air bubbles B sprayed from the spray nozzle 140 will move vertically toward the water surface due to their nature, but the air guide 150 is provided as in the present embodiment, and thus, the air bubbles B sprayed from the spray nozzle 140 may have the force to move forward by energy generated by colliding with the air guide 150, and accordingly, form horizontal water currents. When the water currents formed as above are continuously formed at regular intervals in the water tank, the entire water in the water tank may be moved horizontally, and the air bubbles B may stay in the water tank as long as possible.

The length of the air guide 150 may be set according to the depth of breeding water in the water tank, and when the air guide 150 has an angle of 45 degrees with respect to the water surface, it may show effects on horizontal water movement and dissolved oxygen supply.

The breeding tank needs to supply oxygen to the maximum using limited energy and, at the same time, prevent organic matters from sinking to the bottom by forming moving water currents. In addition, fish in the water tank may feel the flow of water, which may have a favorable effect on growth or survival. Therefore, it is possible to supply oxygen and mix vertical water, as well as form horizontal water currents with the same power, by utilizing the Venturi pipe 130 and the air guide 150.

Although the preferred embodiments of the present invention have been described above, the present invention is not limited thereto, and various modifications and implementations are possible within the scope of the claims and the description and the accompanying drawings, and it is natural that this also belongs to the scope of the present invention.

<Description of Reference Numerals>

| | |
|---|---|
| 30: module type aquaculture water tank | |
| 100: air lifting Venturi apparatus | 110: first inflow pipe |
| 112: inflow portion | 114: connection portion |
| 120: second inflow pipe | 130: Venturi pipe |
| 131: inflow port | 132: outflow port |
| 134: neck portion | 135: injection nozzle |
| 136: lateral passage | |
| 140: spray nozzle | 150: air guide |
| 160: support | 161: first support |
| 162: second support | |
| 210: water supply pump | 230: water supply pipe |
| 310: main fish breeding water tank | |
| 320: intermediate fish breeding water tank | |
| 340: recirculating filtration tank | |
| 341, 342, 343, 344: first filtration tank, second filtration tank, third filtration tank, and fourth filtration tank | |
| T: water tank | |
| A: atmosphere | B: air bubble |

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A module type aquaculture tank system having a stepwise recirculating aquaculture system comprising:
    a main fish breeding water tank including first, second, third, and fourth edges and having a square plane;
    an intermediate fish breeding water tank disposed adjacent to the first edge of the main fish breeding water tank;
    a plurality of recirculating filtration tanks arranged adjacent to each other along the third edge opposite to the first edge of the main fish breeding water tank; and
    an air lifting Venturi apparatus including a plurality of Venturi pipes arranged along the edges of an inside of the main fish breeding water tank and an air guide obliquely extending from an upper end of each of the plurality of Venturi pipes upward in an air spray direction.

2. The module type aquaculture tank system of claim 1, further comprising:
    a water supply pipe extending along an upper edge of the main fish breeding water tank and transporting and supplying water,
    wherein the air lifting Venturi apparatus is connected to the water supply pipe to receive water.

3. The module type aquaculture tank system of claim 2, wherein:
    the water supply pipe extends along four edges of the main fish breeding water tank.

4. The module type aquaculture tank system of claim 1, wherein:
    the plurality of circulating filtration tanks include first, second, third, and fourth filtration tanks that sequentially filter and move flowed breeding water,
    the first filtration tank is configured to allow the breeding water to flow from the main fish breeding water tank, and
    the fourth filtration tank is configured to supply the breeding water to the main fish breeding water tank.

5. The module type aquaculture tank system of claim 1, wherein:
    the main fish breeding water tank is installed so that ⅔ of a depth of the tank is below a ground surface and ⅓ of the depth of the tank is exposed to the ground.

6. The module type aquaculture tank system of claim 1, wherein:
    the air guide is configured in a plate shape having a cross-section convexly rounded upward.

7. The module type aquaculture tank system of claim 1, wherein:
    the air lifting Venturi apparatus further includes
    a first inflow pipe extending in the form of a tube to guide inflow of water;
    a second inflow pipe extending in the form of a tube to guide inflow of air or oxygen; and
    a spray nozzle connected to an outflow port of the Venturi pipe,
    wherein the Venturi pipe includes a through passage having a neck portion having a diameter smaller than a diameter of an inflow port between the inflow port and an outflow port, wherein the first inflow pipe is connected to the inflow port and the second inflow pipe is connected to the neck portion.

8. The module type aquaculture tank system of claim 7, wherein:
    the air guide extends to a height close to an upper end portion of the second inflow pipe.

9. The module type aquaculture tank system of claim 7, wherein:
    the air guide includes a support extending from an upper surface and having one end fixed to the second inflow pipe.

10. The module type aquaculture tank system of claim 9, wherein:
    the support includes a first support located close to an upper end portion of the second inflow pipe and a second support located close to a Venturi pipe connection portion of the second inflow pipe.

11. The module type aquaculture tank system of claim 7, further comprising:
    a water supply pipe extending along an edge of the main fish breeding water tank and transporting and supplying water,
    the first inflow pipe includes an inflow portion having an upper end connected to the water supply pipe and extending vertically downward and a connection portion extending from a lower end of the inflow portion and bent to be connected to the inflow port of the Venturi pipe.

12. The module type aquaculture tank system of claim 7, wherein:
    a diameter of the second inflow pipe is formed to be smaller than a diameter of the first inflow pipe.

13. The module type aquaculture tank system of claim 7, wherein:
    a diameter of the spray nozzle is formed to be smaller than the diameter of the inflow port of the Venturi pipe.

* * * * *